United States Patent
Aslan

(10) Patent No.: US 10,263,441 B1
(45) Date of Patent: Apr. 16, 2019

(54) ELECTRONIC DEVICE CASE WITH CHARGING MECHANISM

(71) Applicant: Gabriel Aslan, Pompano Beach, FL (US)

(72) Inventor: Gabriel Aslan, Pompano Beach, FL (US)

(*) Notice: Subject to any disclaimer, the term of this patent is extended or adjusted under 35 U.S.C. 154(b) by 0 days.

(21) Appl. No.: 15/861,059

(22) Filed: Jan. 3, 2018

(51) Int. Cl.
  *H02J 7/00* (2006.01)
  *H04B 1/3888* (2015.01)
  *H04M 1/02* (2006.01)

(52) U.S. Cl.
  CPC .......... *H02J 7/0044* (2013.01); *H04B 1/3888* (2013.01); *H04M 1/0202* (2013.01)

(58) Field of Classification Search
  CPC combination set(s) only.
  See application file for complete search history.

(56) References Cited

U.S. PATENT DOCUMENTS

| | | | |
|---|---|---|---|
| 6,914,340 B2 | 7/2005 | Becker | |
| 8,093,731 B2 | 1/2012 | Bulthaup | |
| 9,166,427 B2 * | 10/2015 | Panos | H02K 7/1853 |
| 9,698,623 B2 | 7/2017 | Adams | |
| 2010/0210320 A1 * | 8/2010 | Waller | H02J 7/32 455/573 |
| 2014/0152241 A1 * | 6/2014 | Panos | H02K 7/1853 320/107 |

FOREIGN PATENT DOCUMENTS

TR   2016-12375 U  * 10/2016  ............ A45C 11/00

* cited by examiner

*Primary Examiner* — Junpeng Chen
(74) *Attorney, Agent, or Firm* — Albert Bordas, P.A.

(57) ABSTRACT

The present invention provides an electronic device case with a charging mechanism configured to provide backup power to an electronic device. The charging mechanism harvest kinetic energy provided by the user to generate electric current for charging the electronic device, for example in an emergency situation. The charging mechanism includes a spring-loaded retractable handle which when pushed drives a gear set, which in turn drives a dynamo to generate electric current. The case provides a charging connector which is adapted to mate with a charging port of the electronic device to supply the generated electric current for charging the electronic device.

10 Claims, 3 Drawing Sheets

ELECTRONIC DEVICE CASE WITH CHARGING MECHANISM

BACKGROUND OF THE INVENTION

1. Field of the Invention

The present disclosure generally relates to an electronic device case; and more particularly to a portable mobile phone case with a charging mechanism provided therein.

2. Description of the Related Art

Mobile phones have become ubiquitous part of modern life. The number of services offered by the mobile phones continue to increase as more features are developed, and latest technologies become available and incorporated. While providing great convenience and connectivity, this increased usage comes at a cost as additional features and services often require additional battery power. Batteries are deemed to be continuously discharged due to their power consumption, and thus need to be charged before use. Extending the battery longevity becomes increasingly difficult as more and more power is needed by each successive generation electronic devices. When the battery gets depleted and no backup power is available, it brings great inconvenience to users especially in an emergency situation.

At present, the mode of charging the mobile phone generally includes converting an external power supply into electric energy adapted to the mobile phone through a charger, so as to charge the mobile phone. That is, recharging technologies, for the most part, still requires that the user plug their device into a wall socket, or remove the battery and place the battery into a charger that is plugged into a wall socket. Since there is no suitable external power supply available outdoors or in a long journey, charging the electronic device may become very troublesome. For example, a mobile phone may lose battery life when a motorist is stranded on a remote highway. Therefore, there is a need of some portable charging means which could be used to generate backup power to charge the electronic device, for example in emergency situations.

One known solution is disclosed in U.S. Pat. No. 9,698,623 which provides an integrated mobile phone case and charger for providing both a protective casing for a mobile device and includes an integrated solar cell for charging the battery of the mobile device therein. The disclosed device includes a case body defined by a front piece and a back piece, with the back piece including solar cells, electrical wiring, and a charging port. It may be contemplated that such integrated mobile phone case and charger is limited by the availability of sunlight for generating power as it is the only means for charging the mobile phone, so such disclosed device may not be suitable for all emergency situations, for example if the user needs to charge his/her device during night time.

There are some dynamo chargers known in the art which are used with electronic devices like flashlights, and use kinetic energy provided by hand or similar motion to generate electricity for powering the device. The problem with current hand held dynamo chargers is that they are either mechanically complex, difficult to operate or prone to failure. For instance, U.S. Pat. No. 6,914,340 incorporates a hand crank to generate electricity which generally requires use of both hands to crank the handle to activate the generator within. Alternatively, U.S. Pat. No. 8,093,731 uses a pull sting to activate the generator within an assembly which also face the same problem of requiring use of both hands to activate, and further use of the pull string makes the device susceptible to breaking and/or failure.

Other documents describing the closest subject matter provide for a number of more or less complicated features that fail to solve the problem in a convenient and efficient manner. None of these documents suggest the novel features of the present invention.

SUMMARY OF THE INVENTION

It is one of the main objectives of the present invention to provide an electronic device case having a charging mechanism which could provide backup power to charge an electronic device.

It is another objective of the present invention to provide the electronic device case which is convenient to use by a user for charging the electronic device in an emergency situation or the like.

It is yet another objective of the present invention to provide the electronic device case which is portable and cost-effective.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
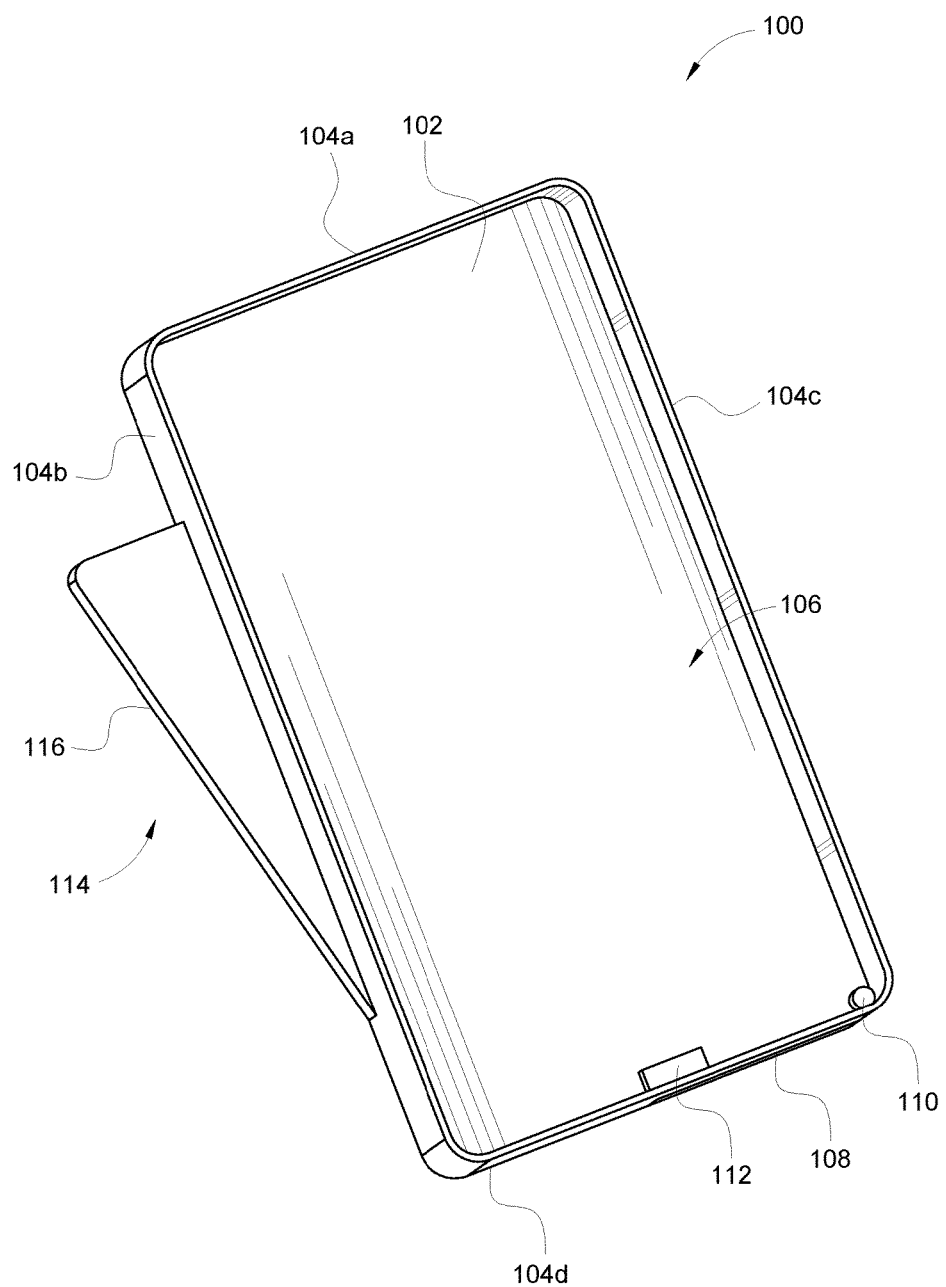
FIG. 1 illustrates a diagrammatic perspective view of an electronic device case, in accordance with one or more embodiments of the present disclosure.

Referring to the drawings, FIG. 1 illustrates a diagrammatic perspective view of an electronic device case (hereinafter simply referred to as "case" and designated by the numeral 100), in accordance with an embodiment of the present disclosure. The case 100 is adapted to provide a protective covering for an electronic device (not shown) to be encased therein. In particular, as shown in the illustrations of the accompanied drawings, the case 100 is designed specifically for encasing a handheld electronic device, such as a mobile phone therein. Hereinafter, the terms "electronic device," "handheld device" and "mobile phone" have been interchangeably used without any limitations. The case 100 may be appropriately dimensioned based on type and size of the mobile phone to be encased therein. It may be understood that although the present invention has been described in terms of the electronic device being a mobile phone; in other examples, the electronic device may include tablets, handheld gaining consoles, cameras, etc. without any limitations.

FIG. 1 shows the case 100 in a portrait mode orientation; however, the orientation of the case 100 may change (e.g., landscape mode orientation or upside-down orientation) or vary depending on the point of view or the orientation of the electronic device. As illustrated in FIG. 1, the case 100 may include a rear wall 102, and four sidewalls, including an upper sidewall 104a, a left sidewall 104b, a right sidewall 104c, and a lower sidewall 104d (hereinafter collectively referred to as sidewalls 104). The rear wall 102 and the four sidewalls 104 together define a cavity 106 in the case 100, which is adapted to hold the electronic device therein. It may be appreciated that the case 100 may include more or lesser number of sidewalls depending on the shape of the electronic device to be encased therein.

It may be contemplated that the electronic device may have many different buttons or control devices, such as touch screen panel, back panel with a camera and a flash, a volume control button, and a power switch. The case 100 may be designed to fit and cover the electronic device without hindering any button or switch, or without impeding any function thereof. The case 100 may include one or more openings so that a user can access the various features, controls, buttons, switches, dials, knobs, and ports of the electronic device (e.g., touch screen, camera lens, camera flash, power button, headphone jack, and the like), when the electronic device is encased therein. The case 100 may further protect the electronic device from being scratched and/or cracked.

Figure 2:
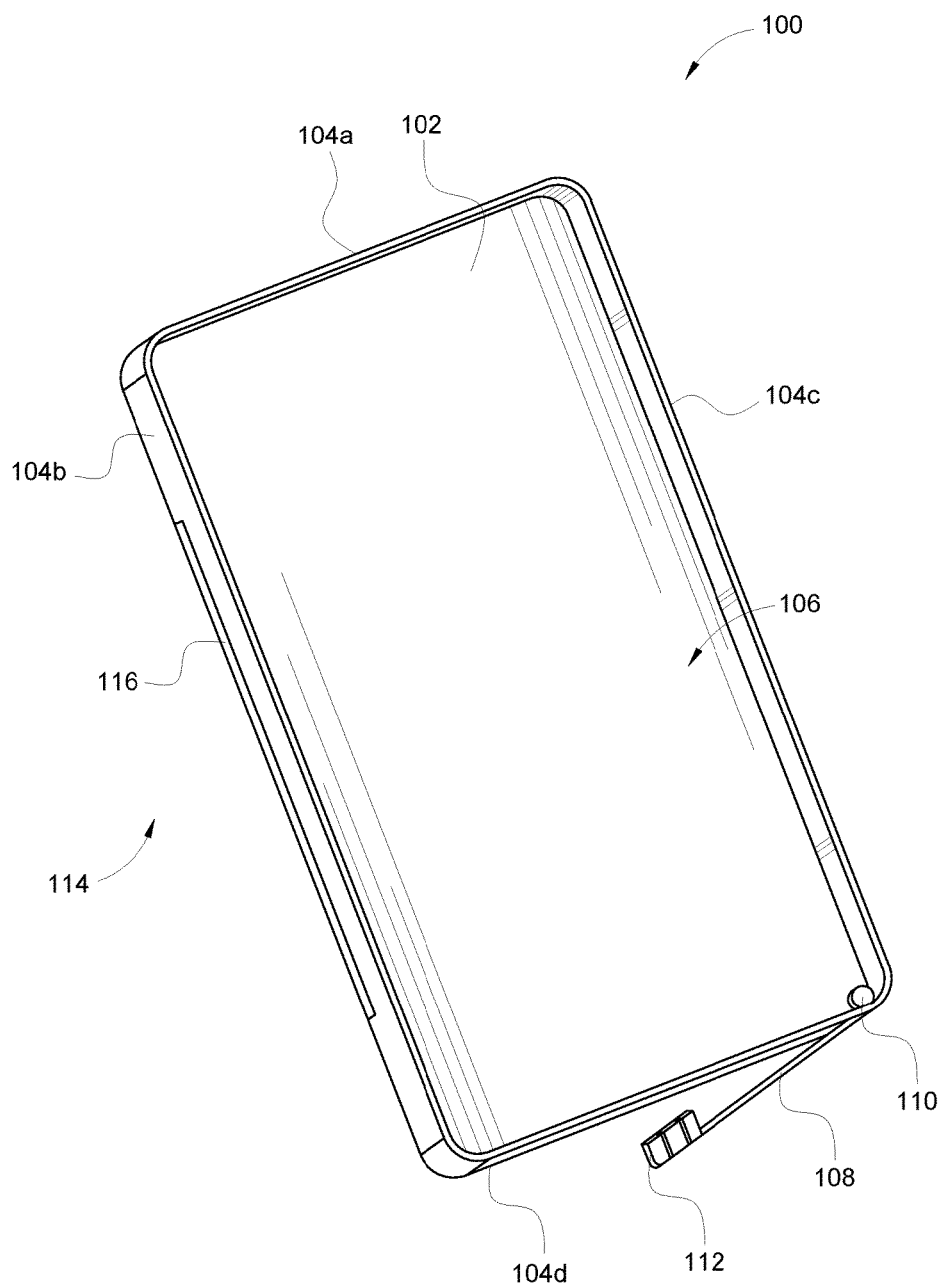
FIG. 2 illustrates a diagrammatic perspective view of the electronic device case of FIG. 1 shown in a configuration to receive an electronic device therein, in accordance with one or more embodiments of the present disclosure.

In an embodiment, as illustrated in FIG. 2, a portion 108 of the lower sidewall 104d of the case 100 may be pivotally connected to one of the left sidewall 104b or the right sidewall 104c by means of a hinge joint 110. In some examples, the entire lower sidewall 104d of the case 100 may be pivotally connected to one of the left sidewall 104b or the right sidewall 104c. Further, in one example, the portion 108 of the lower sidewall 104d may be provided with a charging connector 112 protruding therefrom towards an inside of the cavity 106. The charging connector 112 may be positioned and sized to mate with a charging port of the mobile phone to be encased in the case 100. The charging connector 112 may be of one of the various standard types, such as Micro-USB, USB-C, lightning connector, etc. depending on the type of the mobile phone to be secured inside the case 100. It may be seen that the portion 108 may be pivoted into an open position (as shown in FIG. 2) to allow the mobile phone to be placed into the cavity 106 and further the portion 108 may be pivoted back into a closed position (as shown in FIG. 1) to mate the connector 112 to the charging port of the mobile phone, and thereby secure the electronic device inside the cavity 106 of the case 100.

Figure 3:
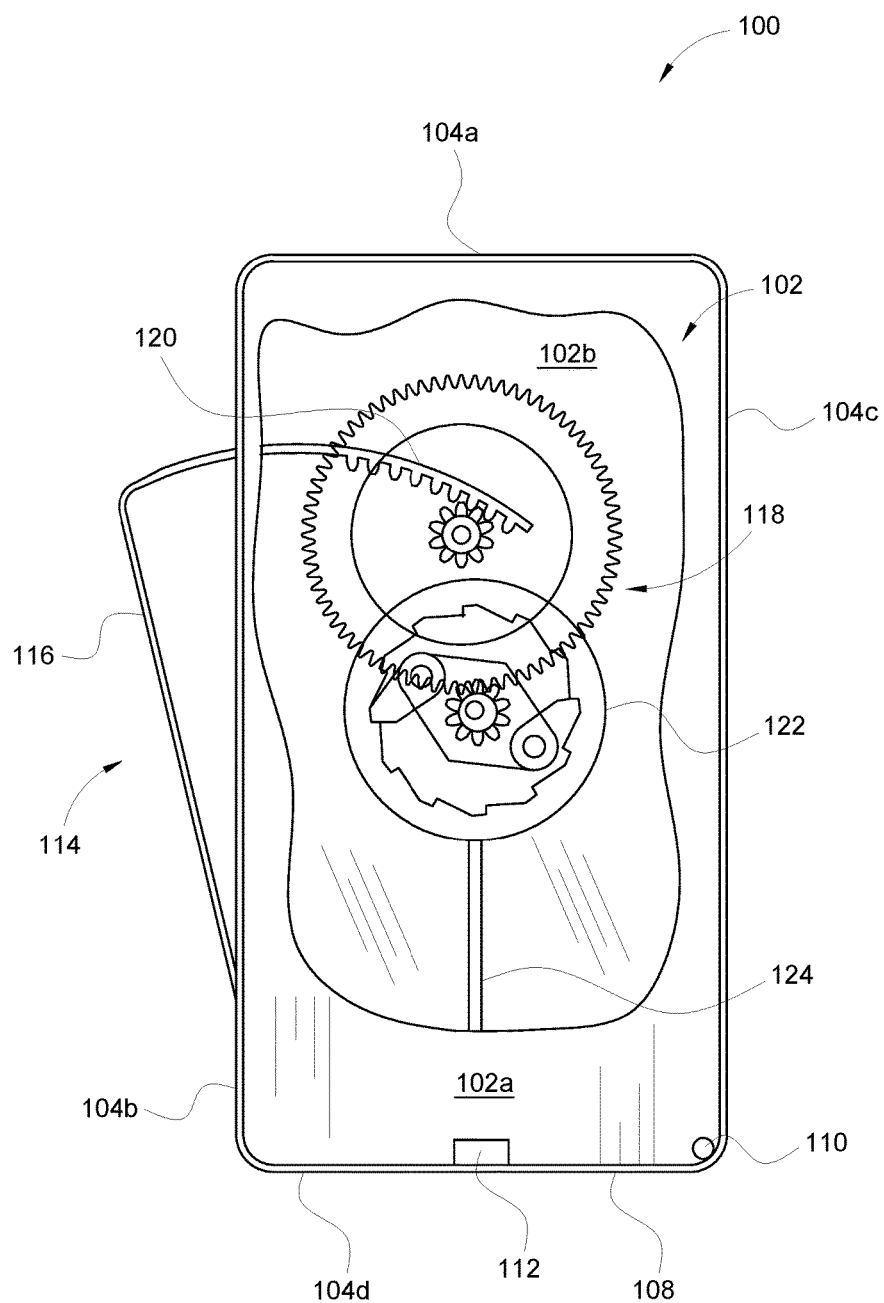
FIG. 3 illustrates a front view of the electronic device case with a partial section of a rear wall removed to show components of a charging mechanism located inside therein, in accordance with one or more embodiments of the present disclosure.

Further, in an embodiment, the rear wall 102 of the case 100 may be a hollow member with components of a charging mechanism 114 located therein. Specifically, the rear wall 102 may be a double-walled structure with one wall 102a disposed so as to define the cavity 106, and other wall 102b disposed towards a rear side of the case 100. In the present examples, the charging mechanism 114 is disposed at least partially inside the hollow region formed between the walls 102a and 102b, in the rear wall 102. The real wall 102 may, therefore, serve as a compartment for holding in place and protecting the various internal components of the charging mechanism 114. FIG. 3 illustrates a front view of the case 100 with the wall 102a of the rear wall 102 partially removed, so as to schematically show components of the charging mechanism 114 located inside therein. It may be appreciated that although the charging mechanism 114 is shown to be located inside the real wall 102 of the case 100; in other examples, the charging mechanism 114 may be exposed and located outside, for example outside of the wall 102b without affecting the scope of the present disclosure.

In one embodiment, as illustrated in FIG. 3, the charging mechanism 114 may include a retractable handle 116 in the form of a lever, which may be located towards one of the left sidewall 104b or the right sidewall 104c of the case 100. As shown, the retractable handle 116 may, preferably, be located towards the left sidewall 104b, such that it may be possible for a right-handed user holding the case 100 in the portrait orientation to conveniently press the handle 116 in a squeezing fashion. In some examples, the handle 116 may be spring loaded such that the handle 116 have a tendency to travel back to an extended position (as shown in FIGS. 1 and 3) when released. In some examples, the case 100 may provide a locking arrangement (not shown) for holding the handle 116 in a retracted position (as shown in FIG. 2) in which the handle 116 is located fully inside the rear wall 102 and flushed with the left sidewall 104b. In some examples, the handle 116 may have a curved edge to conform to the shape of user's hands for better grip and ergonomics.

Further, as illustrated, the charging mechanism 114 may include a gear set 118 with a plurality of individual gears mated with each other in series therein. In particular, the gear set 118 may first be mechanically coupled to a gear 120 of the handle 116 so as to convert the substantial linear motion of the handle 116 to rotational motion. In the process, the gear set 118 is configured to increase the rotational speed (RPM) by using the series of gears with diameters decreasing in succession. Such mechanical arrangement is well known in the art and thus have not been described herein for the brevity of the present disclosure. The charging mechanism 114 further includes a dynamo 122 which may be mechanically coupled to the gear set 118 of the charging mechanism 114 to receive the rotational motion therefrom.

It may be understood that when the user activates the charging mechanism 114 by repeatedly and constantly pressing/pumping the handle 116, the constant motion of the handle 116 may result in rotational motion of individual gears in the gear set 118, via the gear 120. As noted earlier, the gear set 118, in turn, increases the rotational speed and transfer the rotational motion to the dynamo 122. As well known, the dynamo 122 is an electrical generator that produces direct current using the rotational motion. Specifically, the dynamo 122 uses rotating coils of wire and magnetic fields to convert mechanical rotation into a pulsing direct electric current through Faraday's law of induction. Thus, in the case 100, the dynamo 122 is configured to generate electric current by harvesting kinetic energy provided by squeezing action of the handle 116 by a user. Further, the charging mechanism 114 may include a lead wire 124 which may electrically connect the output of the dynamo 122 to the charging connector 112, so as to supply the generated electric current to the charging connector 112. The charging connector 112 may, in turn, supply the generated electric current to the charging port of the mobile phone mated therewith, and thus in effect charge a battery of the mobile phone secured in the case 100.

In the case 100 of the present disclosure, the retractable handle 116 when hand pumped three or four times immediately activates the gear set 118 to drive the dynamo 122. The said three or four pumps on the retractable handle 116 causes the dynamo 122 to spin at a certain RPM producing D.C. volts and generate adequate current that may be sufficient to start charging the rechargeable battery of the mobile phone secured in the case 100. Such rechargeable battery may include any form of battery including Ni-MH, Ni—Cd, or lithium-ion batteries. As noted earlier, the case 100 enables one-handed charging with the squeeze of the retractable handle 116, which in turn allows for users to operate the charging mechanism 114 with one hand, leaving the other hand free for other tasks (e.g., manipulating others objects). The squeezing of the spring-loaded retractable handle 116 allows the user to rest between pumping actions (while the handle 116 itself springs back into the extended position), thereby reducing the likelihood of user fatigue. Further, the present case 100 allows for user to continue using the mobile phone during the recharging process, and as aforementioned, have one hand free throughout the entire process.

The case 100 of the present disclosure harvest kinetic/muscle energy to provide backup power for charging an electronic device. The case 100 with the charging mechanism 114 when used to encase a mobile phone with a rechargeable battery enables the user to generate backup power to charge the battery of the mobile phone, for example for creating additional operating time for the mobile phone. The case 100 may be suitable manufactured/modified to secure any type and size of electronic device therein. In some examples, the sidewalls 104 of the case 100 may be manufactured from soft materials, like rubber to provide shock protection to the mobile phone encased therein, while further providing electric insulation to the components of the charging mechanism 114. The case 100 is small, compact, cost-effective and easy to operate. The case 100 of the present disclosure may particularly be handy in situations, such as, but not limited to, camping, hiking, fishing, natural disasters like earthquakes and hurricanes, and military applications; where there is often no external power source available conveniently.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A phone charging case, comprising:
a dynamo assembly;
a phone having a charging port;
a case having at least one side wall and defining a cavity, said case has a charging connector and a lead wire, said at least one side wall comprises a hinge joint, extending from said hinge joint is a portion that extends to said charging connector, said charging connector protrudes from said portion towards an inside of said cavity, said charging connector is positioned and sized to mate with said charging port of said phone to be encased in said case, whereby said portion is pivoted into an open position to allow said phone to be placed into said cavity and further said portion is pivoted back into a closed position to mate said charging connector to said charging port of said phone, and thereby secure said phone inside said cavity of said case, said charging connector is connected to said dynamo assembly via said lead wire, said dynamo assembly entirely housed within said case;
a lever having a first end and a second end, said first end mounted to said at least one side wall and said second end having a distal end made up of gear teeth;
a gear set entirely housed within said case and simultaneously coupled to said gear teeth and to said dynamo assembly;
said lever adapted to transfer a linear motion to said gear set which converts said linear motion to a rotational motion, said gear set configured to transfer said rotational motion to said dynamo assembly, said dynamo assembly configured to receive the rotational motion from said gear set to convert said rotational motion into a pulsing direct electric current that is transferred to the charging port of said phone via said charging connector.

2. The phone charging case of claim 1 wherein said lever includes a first arm and a second arm, said first arm being spring-loaded, said case includes a slot in said at least one side wall adapted to receive said lever, said second arm having a distal end that includes gear teeth that are pushed against said gear set when said first arm is pushed towards said at least one side wall.

3. The phone charging case of claim 2 wherein said first and second arms are perpendicularly mounted to each other.

4. The phone charging case of claim 1 wherein said lever is secured against said case when not in use.

5. The phone charging case of claim 1 wherein said lever is hingedly connected to said case.

6. The phone charging case of claim 1 wherein said dynamo assembly includes rotating coils of wire and magnetic fields that receive the rotational motion from said gear set.

7. The phone charging case of claim 1 wherein said gear set includes a plurality of gears each having decreasing diameters.

8. The phone charging case of claim 1 wherein said dynamo assembly includes at least one gear that cooperates with said gear set to receive said rotational motion.

9. The lever of claim 2 wherein said second arm is curved.

10. The phone charging case of claim 2 wherein said at least one side wall includes a first and second opening, said first opening is a slot adapted to entirely receive said first arm, said second opening is configured to allow said second arm to pass through to be pushed against said gear set.

* * * * *